F. H. PECK.
DEVICE FOR HOLDING MILK PAILS.
APPLICATION FILED AUG. 19, 1908.
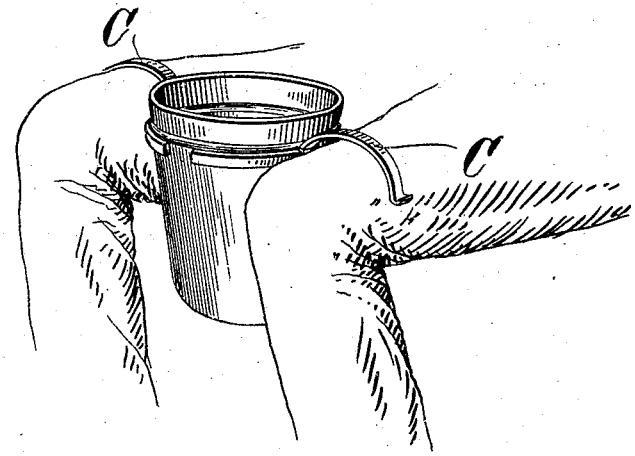
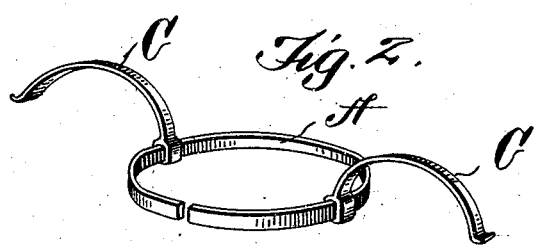
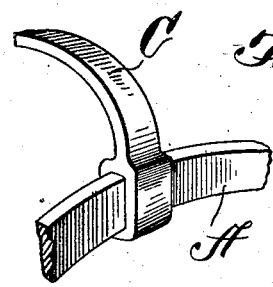

UNITED STATES PATENT OFFICE

FRANKLIN H. PECK, OF NORTH AMHERST, OHIO.

DEVICE FOR HOLDING MILK-PAILS.

No. 906,273.　　　　　　Specification of Letters Patent.　　　　Patented Dec. 8, 1908.

Application filed August 19, 1908.　Serial No. 449,283.

*To all whom it may concern:*

Be it known that I, FRANKLIN H. PECK, a citizen of the United States, residing at North Amherst, in the county of Lorain and State of Ohio, have invented certain new and useful Improvements in Devices for Holding Milk-Pails; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for holding milk pails while cows are being milked and comprises essentially an adjustable spring band designed to engage receptacles of different sizes and also provided with laterally projecting curved arms which are adjustably held upon the band whereby the arms may come diametrically opposite each other at the center of the pail of any size being held.

The invention comprises various details of construction, combinations and arrangements of parts which will be hereinafter fully described and then specifically defined in the appended claim.

I illustrate my invention in the accompanying drawings, in which:—

Figure 1 is a perspective view showing the application of my invention to the legs of a person. Fig. 2 is an enlarged detail view of the holder, and Fig. 3 is an enlarged detail view showing the manner of adjusting the band supporting arms.

Reference now being had to the details of the drawings by letter, A designates a band, preferably of resilient material, the ends of which are normally in contact or nearly so with each other. Said band being of a resilient material will yield and fit the pails or other receptacles of different sizes. Curved arms, designated by letter C, are mounted upon said band, one end of each arm having a loop through which the band passes. Said arms are adjustably held upon the band and are adapted to be brought diametrically opposite each other when the device is used in connection with pails or receptacles of different sizes so as to properly balance the pail.

From the foregoing, it will be understood that, by the provision of the device shown and described, a simple and efficient means is afforded whereby a milk pail may be conveniently held upon the legs of a person milking and dispensing with the necessity of the milker holding the pail by clamping the same between his legs which is the customary manner of holding pails and which is tiresome to the milker.

What I claim to be new is:—

A device for holding milk pails comprising a resilient broken ring angular in cross section, bowed strips, each having an angular outlined integral collar at an end thereof adapted to receive said ring and held from turning thereon, as shown and described.

In testimony whereof I hereunto affix my signature in the presence of two witnesses.

FRANKLIN H. PECK.

Witnesses:
　Jos. WERBECHER,
　LOUIS C. RUCHERT.